United States Patent
Yu et al.

(10) Patent No.: US 11,436,530 B2
(45) Date of Patent: Sep. 6, 2022

(54) CLASSIFYING USER BEHAVIOR AS ANOMALOUS

(71) Applicant: Pivotal Software, Inc., San Francisco, CA (US)

(72) Inventors: Jin Yu, Sydney (AU); Regunathan Radhakrishnan, Foster City, CA (US); Anirudh Kondaveeti, Foster City, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 477 days.

(21) Appl. No.: 16/575,279

(22) Filed: Sep. 18, 2019

(65) Prior Publication Data
US 2020/0012968 A1    Jan. 9, 2020

Related U.S. Application Data

(62) Division of application No. 14/810,328, filed on Jul. 27, 2015, now Pat. No. 10,430,721.

(51) Int. Cl.
| | |
|---|---|
| *G06N 20/00* | (2019.01) |
| *H04L 9/40* | (2022.01) |
| *G06F 16/28* | (2019.01) |
| *G06F 21/31* | (2013.01) |
| *G06F 21/55* | (2013.01) |

(52) U.S. Cl.
CPC ............ *G06N 20/00* (2019.01); *G06F 16/285* (2019.01); *G06F 21/316* (2013.01); *G06F 21/552* (2013.01); *H04L 63/1425* (2013.01)

(58) Field of Classification Search
CPC .................................................. G06F 21/316
See application file for complete search history.

(56) References Cited

U.S. PATENT DOCUMENTS

| | | |
|---|---|---|
| 6,285,999 B1 | 9/2001 | Page |
| 8,838,613 B1 | 9/2014 | Thakur et al. |
| 9,106,687 B1 | 8/2015 | Sawhney et al. |

(Continued)

FOREIGN PATENT DOCUMENTS

| | | |
|---|---|---|
| JP | 2000-148276 | 5/2000 |
| JP | 2004-309998 | 11/2004 |

(Continued)

OTHER PUBLICATIONS

EP Office Action in European Application No. 16747974.0, dated Apr. 21, 2020, 8 pages.

(Continued)

*Primary Examiner* — Daniel T Pellett
(74) *Attorney, Agent, or Firm* — Fish & Richardson P.C.

(57) ABSTRACT

Methods, systems, and apparatus, including computer programs encoded on computer storage media, for classifying user behavior as anomalous. One of the methods includes obtaining user behavior data representing behavior of a user in a subject system. An initial model is generated from training data, the initial model having first characteristic features of the training data. A resampling model is generated from the training data and from multiple instances of the first representation for a test time period. A difference between the initial model and the resampling model is computed. The user behavior in the test time period is classified as anomalous based on the difference between the initial model and the resampling model.

12 Claims, 10 Drawing Sheets

(56) References Cited

U.S. PATENT DOCUMENTS

| | | |
|---|---|---|
| 2007/0282777 A1 | 12/2007 | Guralnik et al. |
| 2009/0199296 A1 | 8/2009 | Xie et al. |
| 2010/0269175 A1 | 10/2010 | Stolfo et al. |
| 2015/0106324 A1 | 4/2015 | Puri et al. |

FOREIGN PATENT DOCUMENTS

| | | |
|---|---|---|
| JP | 2005-259140 | 9/2005 |
| JP | 2009-301536 | 12/2009 |
| JP | 2012-053716 | 3/2012 |
| JP | 2014-134991 | 7/2014 |
| JP | 2014-216009 | 11/2014 |
| JP | 2015-011695 | 1/2015 |
| JP | 2015-099586 | 5/2015 |
| WO | WO 2013/090910 | 6/2013 |
| WO | WO 2014/130015 | 8/2014 |

OTHER PUBLICATIONS

JP Office Action in Japanese Application No. 2018-525505, dated Mar. 4, 2019, 56 pages (with English Translation).

AU Office Action issued in Australian Appln. No. 2019275615, dated Jan. 28, 2021, 4 pages.

Akoglu et al., "Graph based anomaly detection and description: a survey," Journal of Data Mining Knowledge Discovery, Jul. 5, 2014, 29:626-688.

AU Office Action issued in Australian Application No. 2016298250, dated Nov. 19, 2018, 15 pages.

Blei et al., "Latent Dirichlet Allocation," J Machine Learning Research, 2003, 3:993-1022.

Camiña et al., "Towards Building a Masquerade Detection Method Based on User File System Navigation," Advances in Artificial Intelligence, Jan. 1, 2011, pp. 174-186.

International Preliminary Report on Patentability in International Application No. PCT/US2016/044198, dated Jan. 30, 2018, 13 pages.

International Search Report and Written Opinion in International Application No. PCT/US2016/044198, dated Nov. 10, 2016, 18 pages.

Invitation To Pay Additional Fees in International Application No. PCT/US2016/044198, dated Sep. 16, 2016, 7 pages.

Jaccard Index, Dec. 8, 2007, Wikipedia, http://en.wikipedia.org:80/wiki/Jaccard index (Year: 2007).

Office Action issued in Australian Application No. 2016298250 dated Sep. 13, 2019, 3 pages.

Papadimitriou et al., "Web graph similarity for anomaly detection," Journal of Internet Services and Applications, vol. 27, No. 3, Feb. 25, 2010, pp. 365-30.

Weisstein, Eric W. "Singular Value Decomposition." From MathWorld—A Wolfram Web Resource. http://mathworld.wolfram.com/SingularValueDecomposition.html Last Updated Aug. 12, 2015, 1 page.

CLASSIFYING USER BEHAVIOR AS ANOMALOUS

CROSS-REFERENCE TO RELATED APPLICATION

This application is a divisional application of, and claims priority to pending U.S. application Ser. No. 14/810,328, filed on Jul. 27, 2015. The entirety of the disclosure of the prior application is herein incorporated by reference.

BACKGROUND

This specification relates to detecting anomalies in large data sets.

Techniques for detecting anomalies in large data sets can be used in multiple areas of data processing application, including computer network security and health care.

SUMMARY

This specification describes how a data processing system can classify user behavior as anomalous or not anomalous according to a variety of techniques that make use of data that indicates resources accessed by the user in a one or more particular data processing systems. Even though a user may have had permission to access all resources accessed, the system can still classify some user behavior as suspicious.

In general, one innovative aspect of the subject matter described in this specification can be embodied in methods that include the actions of obtaining user behavior data representing behavior of a user in a subject system, wherein the user behavior data indicates one or more resources accessed by the user in the subject system and, for each resource accessed by the user, when the resource was accessed; generating test data from the user behavior data, the test data comprising a first representation of resources accessed by the user during a test time period; generating training data from the user behavior data, the training data comprising a respective second representation of resources accessed by the user for each of multiple time periods prior to the test time period; generating an initial model from the training data, the initial model having first characteristic features of the training data; generating a resampling model from the training data and from multiple instances of the first representation for the test time period, the resampling model having second characteristic features of the training data and the multiple instances of the first representation for the test time period; computing a difference between the initial model and the resampling model including comparing the first characteristic features of the training data and the second characteristic features of the training data and the multiple instances of the first representation for the test time period; and classifying the user behavior in the test time period as anomalous based on the difference between the initial model and the resampling model. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The user behavior data comprises user access records that each represent a folder or a file accessed by the user in a file system. The actions include generating a first matrix that includes vectors of the training data and N instances of a same vector of the test data; performing principal component analysis on the first matrix to generate a first plurality of principal components of the first matrix; generating a second matrix from a plurality of vectors of the training data; and performing principal component analysis on the second matrix to generate a second plurality of principal components of the second matrix, wherein computing a difference between the initial model and the resampling model comprises computing an angle between one or more of the first plurality of principal components and the second plurality of principal components. The actions include generating a first matrix that includes vectors of the training data and N instances of a same vector of the test data; performing singular value decomposition on the first matrix to generate a first plurality of principal components of the first matrix; generating a second matrix from a plurality of vectors of the training data; and performing singular value decomposition on the second matrix to generate a second plurality of principal components of the second matrix, wherein computing a difference between the initial model and the resampling model comprises computing an angle between one or more of the first plurality of principal components and the second plurality of principal components.

Another innovative aspect of the subject matter described in this specification can be embodied in methods that include the actions of obtaining a plurality of topics, each topic being data representing a plurality of file types that frequently co-occur in user behavior data of individual users; obtaining user behavior data representing behavior of a user in a subject system, wherein the user behavior data indicates file types of files accessed by the user in the subject system and when the file was accessed by the user; generating test data from the user behavior data, the test data comprising a first representation of which topics the user accessed during a test time period according to the file types of the user behavior data; generating training data from the user behavior data, the training data comprising respective second representations of which topics the user accessed in each of multiple time periods prior to the test time period; generating an initial SVD model from the test data; generating a resampling model from the training data from multiple instances of the first representation of which topics the user accessed during the test time period; computing a difference between the initial model and the resampling model; and classifying the user behavior in the test time period as anomalous based on the difference between the initial model and the resampling model. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include generating the plurality of topics from file types of files accessed by multiple users in the subject system. The actions include generating the topics using a topic modeling process including defining each user to be a document and each file type accessed by each user to be a term in the corresponding document. Generating the topics using the topic modeling process comprises generating a predetermined number K of topics. The actions include iterating over a plurality of candidate values of K; and selecting a particular candidate value of K as the predetermined number K.

Another innovative aspect of the subject matter described in this specification can be embodied in methods that include the actions of obtaining user behavior data representing behavior of a user in a subject system, wherein the user behavior data indicates one or more resources accessed by the user in the subject system and, for each resource accessed by the user, when the resource was accessed; generating test data from the user behavior data, the test data comprising a first representation of resources accessed by the user during a test time period; generating training data from the user behavior data, the training data comprising respective second representations of resource accessed by the user in each of multiple time periods prior to the test time period; generating an initial path graph from the training data, wherein the initial path graph comprises nodes that represent resources accessed by the user in the subject system during one or more time periods represented by the training data, and links between one or more pairs of nodes, wherein each link between each pair of nodes represents that the user accessed a first resource represented by a first node of the pair from a second resource represented by a second node of the pair; generating a test path graph from the test data, wherein the test path graph comprises nodes that represent resources accessed by the user in the subject system during the test time period, and links between one or more pairs of nodes, wherein each link between each pair of nodes represents that the user accessed a first resource represented by a first node of the pair from a second resource represented by a second node of the pair; computing a difference between the initial path graph and the test path graph; and classifying the user behavior by the user in the test time period as anomalous based on the difference between the initial path graph and the test path graph.

The foregoing and other embodiments can each optionally include one or more of the following features, alone or in combination. The user behavior data comprises user access records that each represent a folder or a file accessed by the user in a file system. Generating the initial path graph comprises generating the initial path graph from training data of the user and training data of one or more peers of the user in the subject system. The actions include determining one or more other users in the subject system that accessed at least a threshold number of resources in common with the user during the time periods represented by the training data; and designating the one or more other users as peers of the user in the subject system. Computing the difference between the initial path graph and the test path graph comprises computing a Jaccard distance between the initial path graph and the test path graph, wherein the Jaccard distance is based on the cardinality of intersecting nodes between the initial path graph and the test path graph, and the cardinality of the union of nodes between the initial path graph and the test path graph. Computing the difference between the initial path graph and the test path graph comprises obtaining weights associated with resources represented by nodes in the initial path graph and the test path graph; and computing a weighted Jaccard distance between the initial path graph and the test path graph, wherein the weighted Jaccard distance is based on a sum of weights for all nodes that occur in the intersection of the initial path graph and the test path graph, and the sum of weights for all nodes that occur in the test path graph. The actions include assigning higher a weight to a folder in the subject system than a subfolder of the folder in the subject system. The actions include assigning a same weight to all resources in the subject system that are above a threshold number of levels in a hierarchy of the resources. The weights are based on a measure of popularity of the resources. The actions include generating a hybrid graph, wherein the hybrid graph comprises user nodes that represent users in the system and resource nodes that represent resources in the system, wherein the hybrid graph includes user-resource links, wherein each user-resource link represents a respective user accessing a resource in the system, and resource-resource links, wherein each resource-resource link represents a structure of resources in the system; computing a measure of popularity for one or more resources in the system according to the hybrid graph; selecting one or more nodes having the highest measures of popularity; and adding, to the initial path graph for the user, paths to each of the one or more nodes having the highest measures of popularity.

Particular embodiments of the subject matter described in this specification can be implemented so as to realize one or more of the following advantages. The system can classify user access patterns as anomalous even if the patterns have not been seen before, which rule-based systems cannot do. The system can use test data resampling to make anomaly detection much more sensitive than previous approaches. The system can generate a user model for each user in the system and automatically flag a user's behavior as anomalous. The actions of a user's peers can be incorporated in the analysis to reduce false positives in anomaly detection. The system can make use of data at a more granular level than previous approaches, e.g., it can use data describing folder accesses and file accesses. The system can use topic modeling to detect when a user is accessing unexpected groups of file types.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
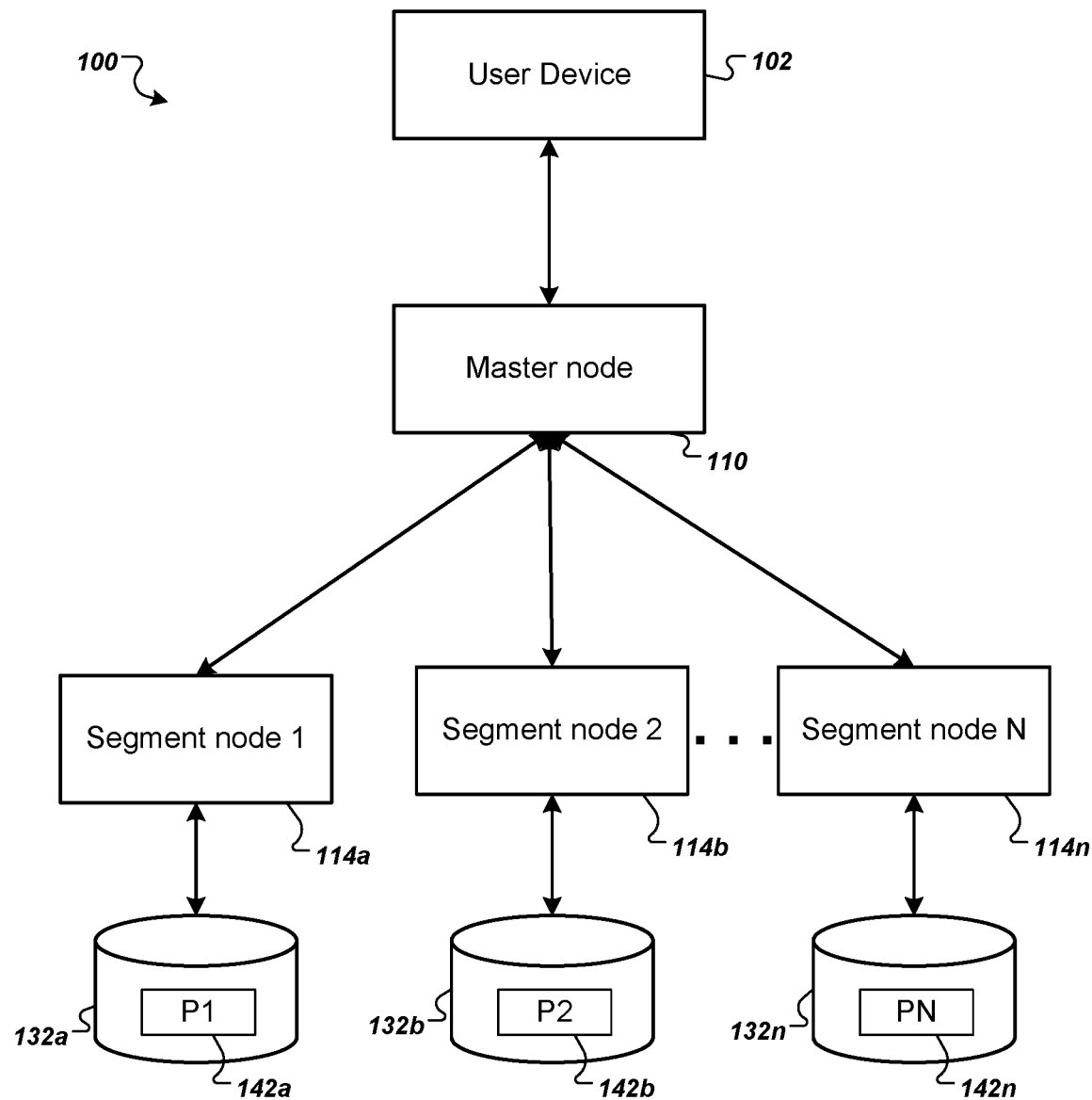
FIG. 1A is a diagram of an example anomaly detection system.

FIG. 1A is a diagram of an example anomaly detection system 100. The anomaly detection system 100 is an example of a computing system that can be used to detect anomalous user behavior. In general, the anomaly detection system 100 includes a user device 102, a master node 110, and multiple segment nodes 114a, 114b, through 114n.

The anomalous user behavior to be detected is typically behavior by users in a subject system that is distinct from the anomaly detection system 100. For example, the subject system can be a computer network belonging to a corporation.

A user of the user device 102 can access data stored in the anomaly detection system 100 by communicating with the master node 110. The user device 102 can be a personal computer, smartphone, or any other kind of computer-based device with which a user can interact. For example, a user can query the master node for anomalous user behavior that occurred during a specified time period, e.g., the previous day or week. The master node 110 can then communicate with the segment nodes 114a-n to obtain an identification of users whose behavior during the specified time period was suspicious, which the master node 110 can then communicate to the user device 102.

The master node 110 and each segment node 114a-n are implemented as software installed on one or more physical computers or as software installed as one or more virtual machines on one or more physical computers, or both. In addition, each segment node 114a-n may execute multiple segment processes within the segment node. For example, the segment nodes may be multi-core computers in which each segment process executes on a different core. In some implementations, the each physical segment nodes has between 8 and 12 segment processes.

The master node 110 is connected to each of the segment nodes 114a-n, e.g., by one or more communications networks, e.g., a local area network or the Internet, or by a direct connection. In addition, each of the segment nodes 114a-n may be connected to one or more other segment nodes. The master node 110 assigns each segment node to operate on a portion of the data stored in the anomaly detection system 100.

Each data portion is generally a collection of user behavior data by users in the subject system. To leverage parallel processing by the segment nodes 114a-n, all user behavior data for each distinct user can be stored in a single portion. However, the segment nodes 114a-n can also communicate with each other to share information so that a single segment node can obtain all user behavior data for a particular user.

The user behavior data is data representing users accessing resources in the subject system. For example, the data can represent how many times a user accessed a server, a website, a web page, a file, a directory, a database, or any other accessible resource in the subject system.

Each instance of a user accessing a resource is represented in the user behavior data, e.g., by an access record. An access record can include information describing the resource, the user, and the date and time that the resource was accessed. The user behavior data may also include aggregated access records. For example, the user behavior data can include, for each user, data representing how many times each resource was accessed during a particular time period.

The system 100 can store millions or billions of access records in any appropriate format. For example, the system can store each access record as a file in a file system or a line or row of data in a file in a file system or a record in a database. The access records can be indexed.

The master node 110 can divide the processing among N segment nodes, e.g., the segment nodes 114a-n. The segment nodes can obtain the access records by communicating with data nodes in an underlying distributed storage system, for example, one implementing a Hadoop File System (HDFS). The data is generally partitioned among multiple storage devices and can be organized by any appropriate key-value storage subsystem. For example, the data portions can be table partitions of a relational database distributed among multiple storage devices, e.g., as part of a massively parallel processing (MPP) database. The data portions can also be stored as part of a distributed, non-relational database, e.g., in a Hadoop Database (HBase) that organizes data by key-value pairs in distinct column families and distributed across multiple storage devices. The data portions can also be partitioned to be stored locally by the segment nodes 114a-n.

In the example anomaly detection system 100 illustrated in FIG. 1A, the master node 110 has assigned the segment node 114a to operate on access records 142a for a first group of users stored in a first storage subsystem 132a of the underlying distributed storage system. Similarly, the master node 110 has assigned the segment node 114b to operate on access records 142b stored in a second storage subsystem 132b, and the master node 110 has assigned the segment node 114n to operate on access records 142n stored in an Nth storage subsystem 132n.

Figure 1B:
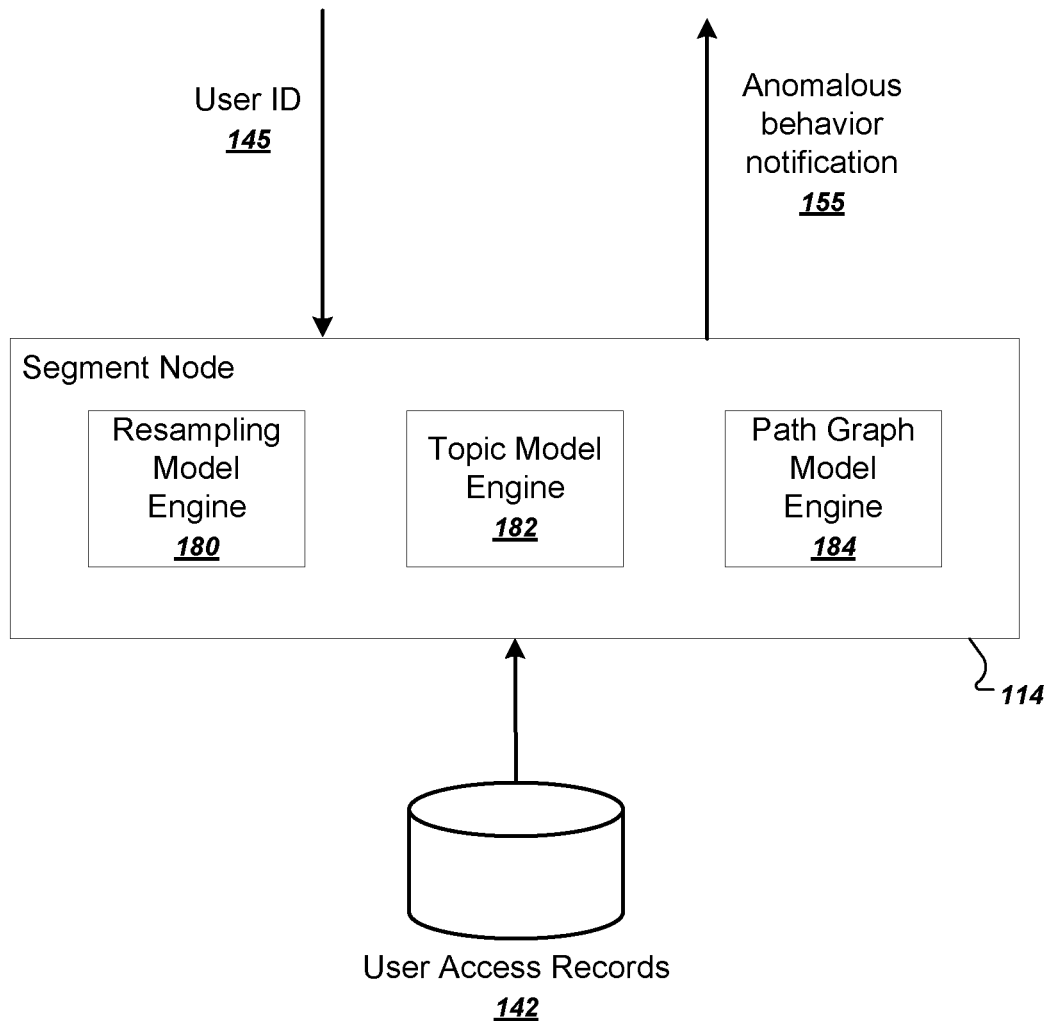
FIG. 1B is a diagram of a segment node.

FIG. 1B is a diagram of a segment node 114. Each of the segment nodes 114a-n in the system computes per-user models in parallel. In other words, the system generates one or more distinct models for each user of the subject system.

Each segment node 114 runs anomaly detection software installed on the segment node 114 that that receives a user ID 145 assigned by a master node. The anomaly detection software then obtains the user access records 142 of a user corresponding to the user ID 145 from an underlying storage subsystem and determines which access records 142 are training data and which access records are test data. Some individual access records may be used as both training data and test data.

In general, the test data includes a representation of the resources accessed by the user for a recent time period, and the training data includes representations of resources accessed for multiple time periods prior to the time period of the test data. For example, if the time periods are weeks of the year, the test data can include a representation of resources accessed during a most-recent week, and the training data can include representations of resources accessed during the previous month or year. The time period corresponding to the test data may be referred to as the test period.

The test data need not represent a recent time period, however. For example, the system can use, as test data, access records for any appropriate time period in order to identify anomalous behavior that occurred in the past.

The anomaly detection software installed on the segment node 114 makes use of one or more modeling engines 180, 182, and 184 installed on each segment node in order to determine whether the user's access records 142 reflect anomalous behavior by the user. All of the modeling engines 180, 182, and 184, or only some of the modeling engines 180, 182, and 184, may have been installed on any particular segment node.

The segment node 114 can use a resampling model engine 180, which resamples some of the test data as training data. The resampling model is described in more detail below with reference to FIG. 2. The segment node 114 can also use a topic model engine 182, which generates a topic model based on file types accessed by the user. The topic model is described in more detail below with reference to FIG. 3. The segment node 114 can also use a path graph model engine 184, which builds path graphs from training data and test data to determine anomalous behavior. The path graphs are described in more detail below with reference to FIGS. 4-7.

The system can use the modeling engines 180, 182, and 184 to classify the test data of the user access records 142 as anomalous or not anomalous. If the test data is classified as anomalous, the segment node 114 can generate an anomalous behavior notification 155 and provide the notification 155 to another node in the system, e.g., back to the master node 110. The master node 110 can then propagate the notification back to the user device 102.

Figure 2:
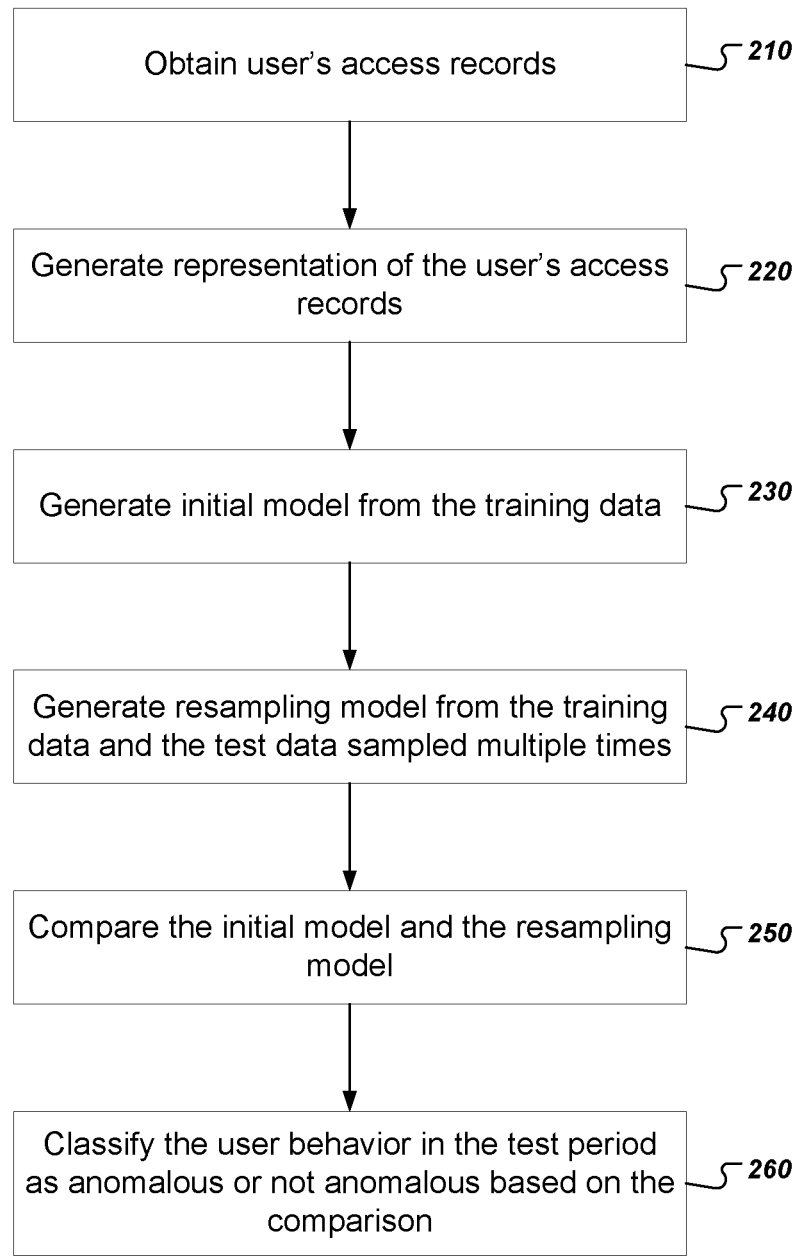
FIG. 2 is a flow chart of an example process for classifying user access records as anomalous using a resampling model.

FIG. 2 is a flow chart of an example process for classifying user access records as anomalous using a resampling model. In general, the system determines how much test data, when resampled multiple times, affects the characteristic features of an initial statistical model of the user's access behavior. The example process will be described as being performed by an appropriately programmed system of one or more computers.

The system obtains a user's access records (210). As described above, the access records indicate which resources were accessed by a user during each of multiple time periods.

The system generates a representation of the user's access records (220). In some implementations, the representation is a vector or a matrix, and the system generates a vector for each of several time periods. Each position in the vector represents a resource in the subject system, and each value in the vector represents a number of times that the user accessed the resource in the subject system that corresponds to the position of the value in the vector.

The system generates an initial model using the training data (230). As described above, the training data includes representations of the user's access records for previous time periods.

The system can generate the initial model as any appropriate statistical model for representing characteristic features a data set. In some implementations, the system represents the data as a matrix and uses any appropriate matrix factorization technique, e.g., Singular Value Decomposition (SVD), Principal Component Analysis (PCA), or Non-negative Matrix Factorization (NMF), to generate the representation of the characteristic features of the training data for the user.

For example, the system can generate a matrix X of the access record vectors from the training data. The system can then perform SVD to generate a matrix T representing the principal components of X.

The system generates a resampling model from the training data and the test data sampled multiple times (240). Resampling the test data multiple times has the effect of magnifying differences between the training data and the test data.

For example, if using SVD to generate the resampling model, the system can use all vectors of the training data and N instances of the vector of test data. In other words, the system can generate a matrix X' that includes the vectors of training data and N instances of the vector of test data. Generally, the matrix X' will include more columns than the matrix X for the initial model. The system can then perform SVD to generate a matrix representing the principal components of X'

The system compares the initial model and the resampling model (250). The system can use any appropriate comparison method to determine how different the initial model and the resampling model are, for example, by computing a distance between characteristic features of the models. If using SVD, the system can compute the angle between the principal components for the initial model T and the principal components for the resampling model T.'

The system classifies the user behavior in the test period as anomalous or not anomalous based on the comparison (260). The difference between the initial model and the resampling model will be large whenever the test data had a more dramatic effect on the resampling model relative to the initial model. Thus, the test data is more likely to be anomalous when the difference is large.

If, however, the difference between the initial model and the resampling model is small, the test data had a minimal impact on the initial model generated from only the training data. Thus, the test data is less likely to be anomalous.

The system can thus determine whether the difference between the models satisfies a threshold and classify the user behavior as anomalous if the difference satisfies the threshold.

Figure 3:
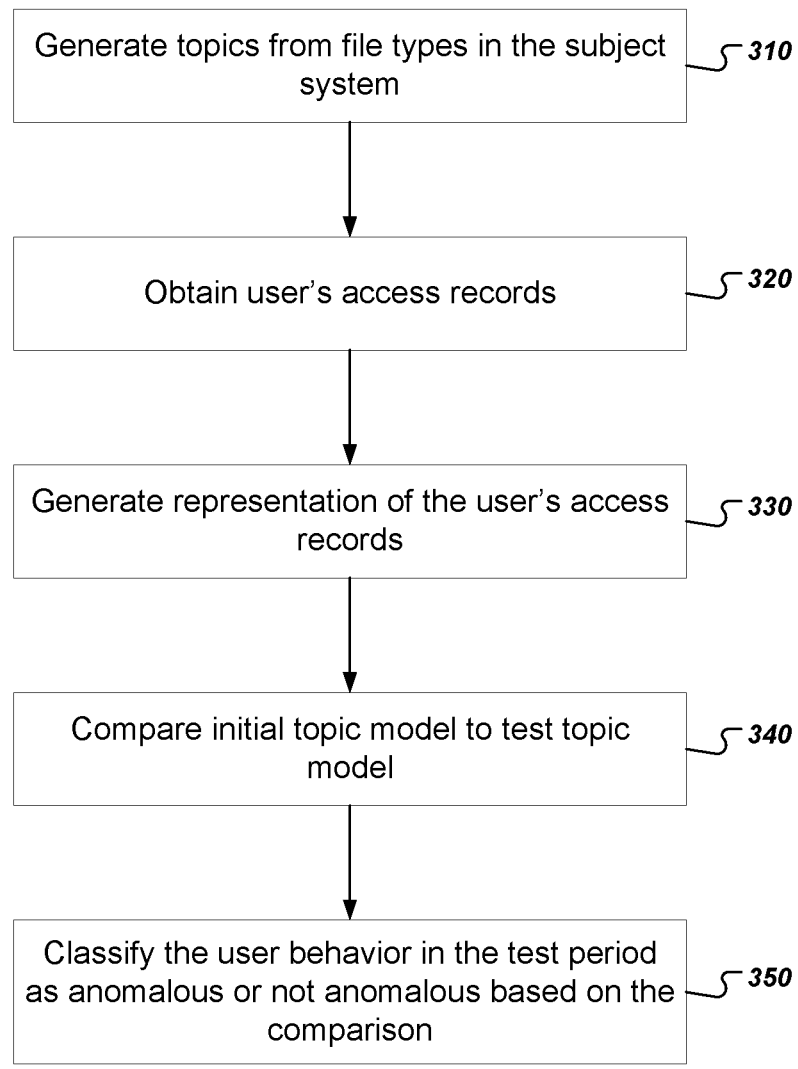
FIG. 3 is a flow chart of an example process for classifying user behavior as anomalous using a topic model.

FIG. 3 is a flow chart of an example process for classifying user behavior as anomalous using a topic model. In this example process, the system represents a user's behavior in the subject system according to groups of related file types accessed by the user, rather than according to resources accessed by the user. The groups of related file types can be represented as topics and the system can classify a user's behavior as anomalous if the test data indicates that the user accessed substantially different file types during the test period. The process will be described as being performed by an appropriately programmed system of one or more computers.

The system generates topics from files in the subject system (310). The system can generate topics where each topic represents groups of file types that frequently co-occur in user access records of individual users. Typically, the system generates the topics using user access records from many different users.

In some implementations, the system uses the extension of a file to indicate the type of the file. However, the system may use other metadata about files in the system to determine file types.

The system can use any appropriate topic modeling technique by treating each user as a document and each file type accessed by the user as a term occurring in the document. The system can use the topic modeling technique over all user access records that represent users access files in the subject system. The result is then a number of topics that each represent frequently occurring file types. The system can assign a unique identifier for each discovered topic.

For example, the system can generate K topics using Latent Dirichlet Allocation (LDA). LDA takes as an input parameter a number K of topics, and generates a probability distribution for each of the K topics. Each probability distribution assigns a likelihood to a particular file type being accessed by a user who accesses file types assigned to the topic.

The system can choose a value for K by iterating over candidate values for K and computing the perplexity of the model. The system can choose a value for K that balances the number of topics in the model and the perplexity of the model.

The system obtains a user's access records (320). The access records can indicate electronic files that were accessed by the user and file type information of the files accessed by the user.

The system generates a representation of the user's access records (330). The system can generate a vector for each of several time periods. Each element of the vector represents one of the K topics, and each value in the vector represents a number of times the user accessed a file type belonging to each of the corresponding topics. In some implementations, each element represents a number of days in each time period that the user accessed a file type belonging to each of the corresponding topics.

The system uses an initial SVD model generated from training data to reconstruct the test data (340). As described above, the system can use any appropriate statistical model to represent the characteristic features of the training data and the test data, e.g., SVD or PCA.

The system can similarly use the resampling technique described above with reference to FIG. 2 to determine how the initial SVD model changes relative to a resampling model when the test data is added multiple times to the training data.

In some implementations, the system can use singular value decomposition (SVD) to compare the models. For example, the system can a matrix X from the training data, where each column represents a time period in the training data and each row represents one of the K topics. The system can then perform SVD to generate a matrix Y. The system can then select, from Y, the top-k right singular column vectors V as being representative of the user's behavior during the training time period.

The system can then compare the test data, represented as a vector of training data by computing a distance D according to:

$$D=\|x_{t+1}-V\times(V^T\times x_{t+1})\|$$

The system classifies the user behavior in the test period as anomalous or not anomalous based on the comparison (350). If the difference satisfies a threshold, the system can classify the user behavior as anomalous. Otherwise, the system can classify the user behavior as not anomalous.

Figure 4:
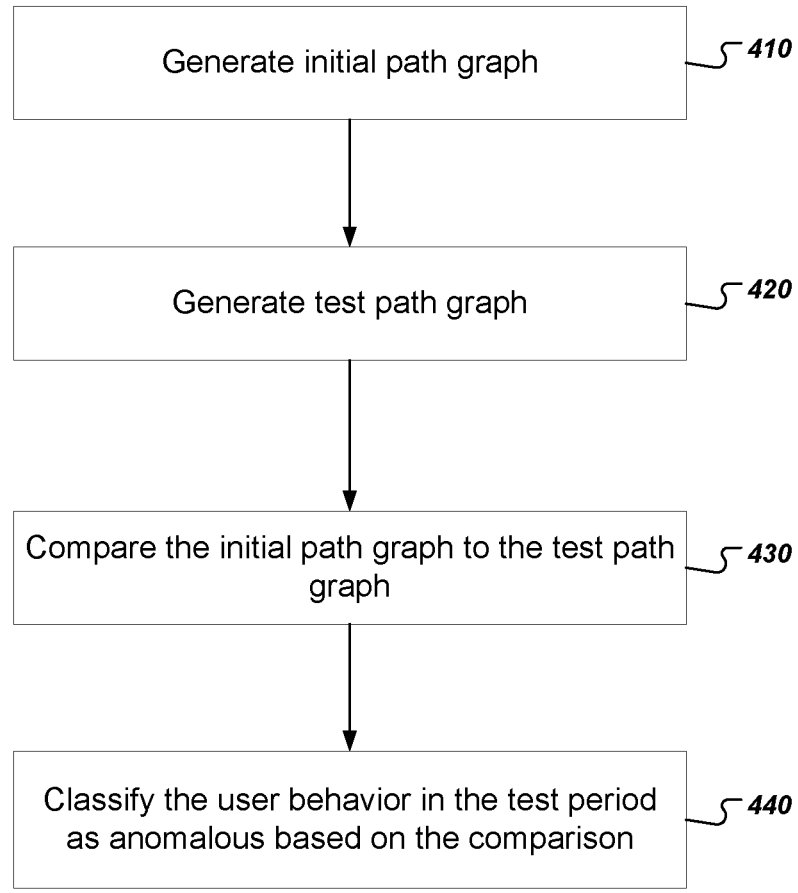
FIG. 4 is a flow chart of an example process for classifying user behavior as anomalous using a path graphs.

FIG. 4 is a flow chart of an example process for classifying user behavior as anomalous using a path graphs. A path graph is a representation of how a user navigated to resources in the subject system during the relevant time periods. If the path graph changes significantly in the test period, the system can classify the user behavior as anomalous. The process will be described as being performed by an appropriately programmed system of one or more computers.

The system generates an initial path graph using training data (410). A path graph represents relationships between resources accessed by the user in the subject system.

A path graph includes nodes that represent resources accessed by the user in the subject system. For example, the nodes of the path graph can represent folders and files in a file system. The nodes of the path graph can also represent web pages maintained by the subject system.

A path graph includes a link between two nodes to represent a user accessing a one node from another. In other words, the path graph includes a link to represent a user visiting a first resource represented by a first node, and then visiting a second resource represented by a second node. The links can therefore represent folder and subfolder relationships, links between web pages, symbolic links or shortcuts in a file system, or any other appropriate method for accessing one resource from another.

Figure 5A:
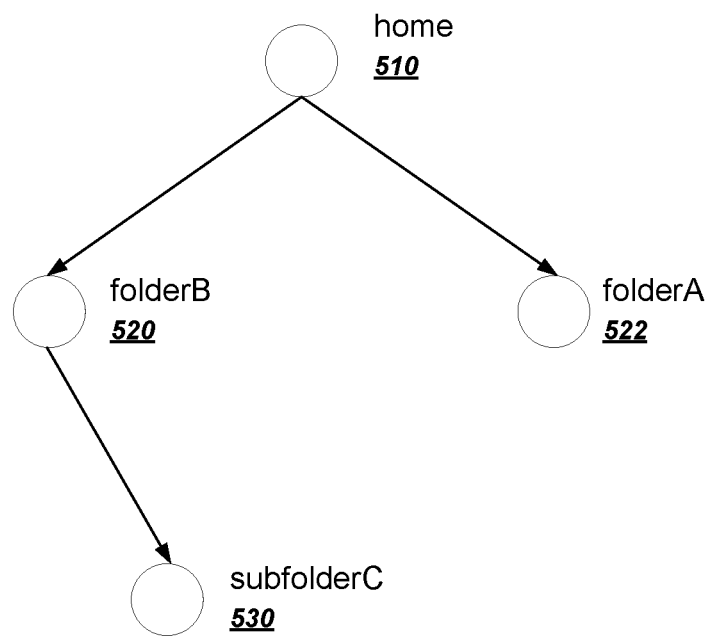
FIG. 5A illustrates an initial path graph.

FIG. 5A illustrates an initial path graph. In this example, the nodes of the path graph represent folders in a file system, and the links represent a user accessing a subfolder from a parent folder.

The initial path graph has a root node 510 representing the "home" directory. The initial path graph also include other nodes 520, 522, and 530 representing subfolders of the "home" directory.

A link between the node 510 and the node 520 represents that the user visited the "home" directory and then visited "folderB" from the "home" directory. Similarly, a link between the node 520 and the node 530 represents that the user visited the "subfolderC" directory from the "folderB" directory.

Thus, when the system generates the initial path graph using the training data, the resulting initial path graph includes nodes representing resources accessed by the user and links representing how the user navigated to those resources.

The system can also include data from the user's peers when generating the initial path graph. In some instances, using an initial path graph with data from the user's peers can reduce false positive detections of anomalous behavior.

A user's peers are generally users in the subject system that have a substantial overlap with the user in terms of resources accessed. For example, a user's peers may be other members on a same team within an organization or other employees in a same department, location, or company.

In some implementations, the system determines the user's peers by identifying other users having at least a threshold amount of resource overlap. In other words, the system uses the training data for all users in the subject system to compute which other users accessed at least the threshold amount of resources in common with the user under consideration, e.g., at least 10%, 50%, or 80% of the same resources.

The system can also use organizational data for an organization owning the subject system. For example, the system can designate users who are part of the same team or department as peers. The system can also designate users having the same or similar roles within the organization to be peers.

After identifying the user's peers, the system can generate the initial path graph using training data for the user and all of the user's peers.

As shown in FIG. 4, the system generates a test path graph using test data (420). The test path graph is a path graph generated from the test data. As discussed above, the test data may represent resources accessed by the user during a most recent time period. Thus, the test path graph represents how the user navigated to resources in the subject system during the time period represented by the test data.

Figure 5B:
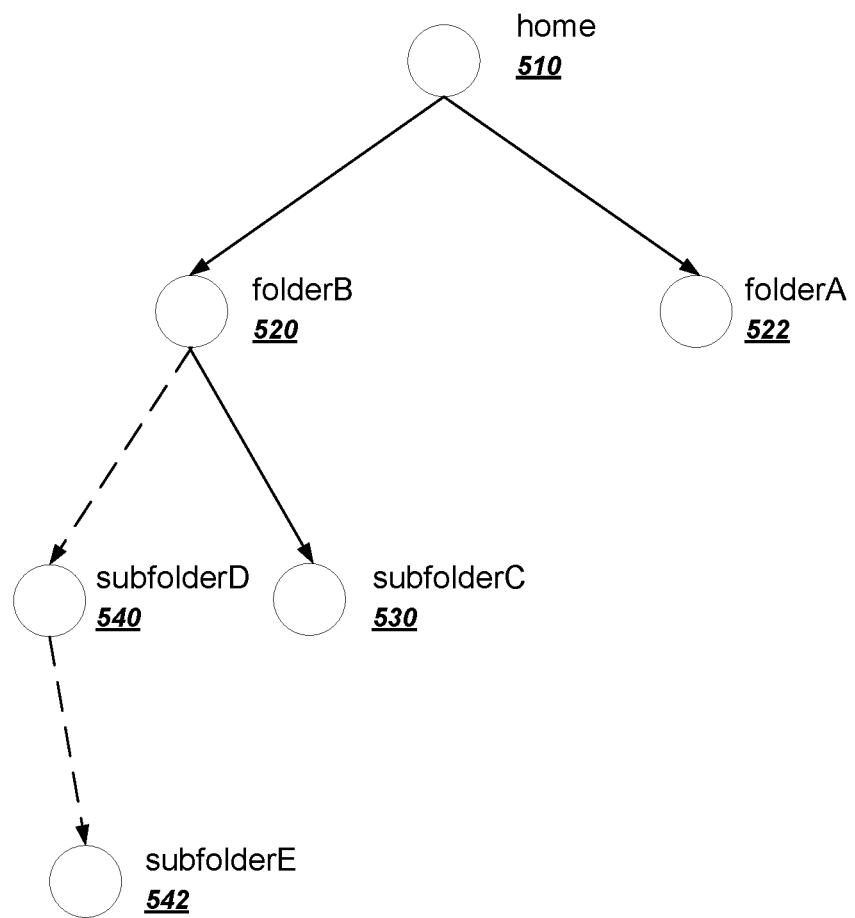
FIG. 5B illustrates an example test path graph.

FIG. 5B illustrates an example test path graph. The test path graph includes two new nodes, nodes 540 and 542, and corresponding new links, represented by dashed lines. The new nodes 540 and 542 represent resources accessed by the user during the test time period, but not during the training time periods.

As shown in FIG. 4, the system compares the initial path graph and the test path graph (430). The system can use a variety of methods for comparing the initial path graph and the test path graph. In general, the system computes measure of overlap between the initial path graph and the test path graph. A test path graph that significantly overlaps the initial path graph is indicative of normal user behavior. On the other hand, a test path graph having many nodes and edges that do not overlap the initial path graph is indicative of anomalous user behavior.

For example, the system can compute a Jaccard distance D between an initial path graph, G1, and a test path graph, G2, according to:

$$D = 1 - \frac{|G1 \cap G2|}{|G1 \cup G2|},$$

where |G1∩G2| represents the cardinality of the intersection of the set of nodes in G1 and the set of nodes in G2, and |G1∪G2| represents the cardinality of the union of the set of nodes in G1 and the set of nodes in G2.

In some implementations, the system computes a weighted Jaccard distance according to weights to the resources. The system can assign weights to the resources based on a variety of factors. For example, the system can assign higher weights to resources that include sensitive information, e.g., sensitive corporate or employee data. Thus, the detection of anomalous behavior becomes more sensitive to a user accessing folders with higher weights.

The system can also assign weights based on hierarchical relationships of the resources. For example, if the resources represent folders and subfolders, the system can assign a higher weight to a folders than a subfolder of the folder. This makes the detection of anomalous behavior less sensitive to situations where a user merely accesses a new subfolder of a folder that the user already accessed. In some implementations, the system assigns a first weight to all resources that are above a threshold number of levels in the hierarchy, and a smaller, second weight to all other resources. For example, the system can assign a first weight to a root directory of a file system and all directories up to three levels below the root directory. For all other subfolders, the system can assign the second weight.

The system can also assign weights based on the age of resources in the system. In some situations, anomalous behavior is more likely to involve newly created resources than old resources. Thus, the system can increase the weight assigned to new resources and decrease the weight for resources as the resources become older.

The system can also assign weights based on a measure of popularity of the resources in the subject system. For example, the system can lower the weights assigned to popular resources accessed by many users in the subject system. The system can similarly lower the weights of all child resources of popular resources, e.g., subfolders of popular folders.

After assigning weights to the resources in the system, the system can compute the weighted Jaccard distance WD according to:

$$WD = 1 - \frac{\sum_{i \in G1 \cap G2} w_i}{\sum_{i \in G2} w_i},$$

where the numerator term represents the sum of weights for all nodes that occur in the intersection of G1 and G2, and the denominator term represents the sum of weights for all nodes that occur in G2.

The system classifies the user behavior in the test period as anomalous or not anomalous based on the comparison (440). If the computed distance between the initial path graph and the test path graph is large, the user behavior is more likely to be anomalous. If the computed distance is small, the user behavior is less likely to be anomalous. Thus, the system can classify the user behavior as anomalous if the computed distance satisfies a threshold.

Anomalous events typically require follow up by a forensic team of the subject system. Thus, the system can adjust the threshold for each test time period based on the anticipated availability of the team to investigate the anomalous cases.

For example, the Jaccard distance between the initial path graph illustrated in FIG. 5A and the test path graph illustrated in FIG. 5B is a relatively low 0.333. Therefore, the system may not consider the user behavior to be anomalous.

Figure 5C:
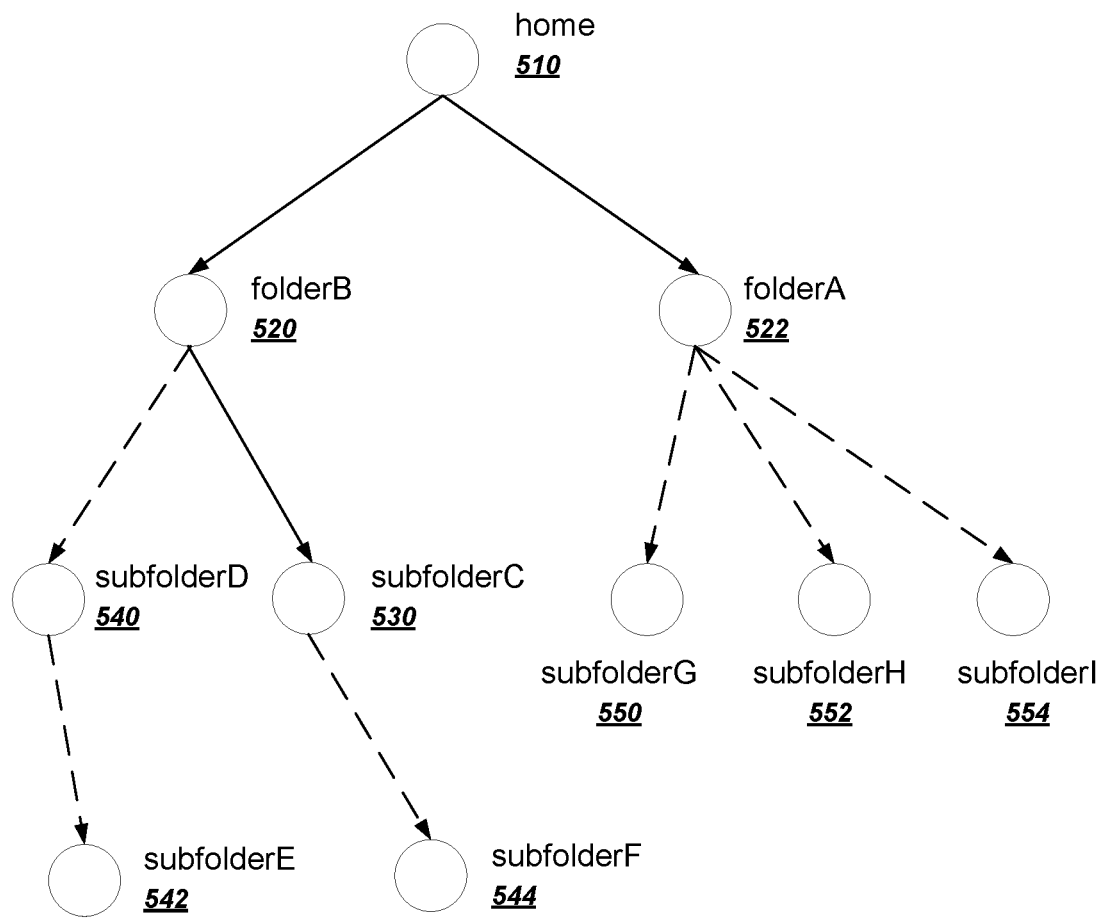
FIG. 5C illustrates another example test path graph.

FIG. 5C illustrates another example test path graph. The test path graph includes six new nodes 540, 542, 544, 550, 552, and 554, and corresponding new links, represented by dashed lines.

The Jaccard distance between the initial path graph illustrated in FIG. 5A and the test path graph illustrated in FIG. 5C is a relatively high 0.6. Therefore, the system may consider the user behavior to be anomalous.

Figure 6:
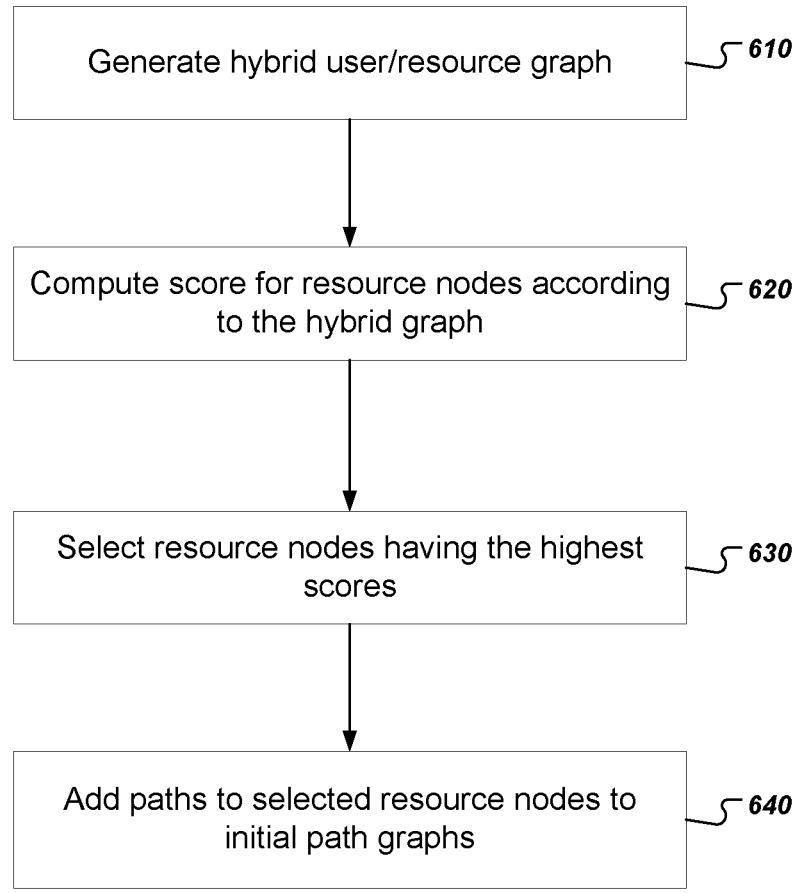
FIG. 6 is a flow chart of an example process for determining the most popular resources in the subject system.

FIG. 6 is a flow chart of an example process for determining the most popular resources in the subject system. The system can take into account which resources are popular when making determinations of user behavior that is anomalous or not. If a user's behavior is normal but for accessing a resource that is otherwise popular, the system avoid flagging the users behavior as anomalous. The process will be described as being performed by an appropriately programmed system of one or more computers.

The system generates a hybrid user/resource graph (610). The hybrid graph has two types of nodes, user nodes representing users and resource nodes representing resources in the subject system. The hybrid graph also has two types of corresponding links, a resource-resource link representing a structure of resources in the subject system, and a user-resource link representing a user accessing a resource in the subject system.

Figure 7:
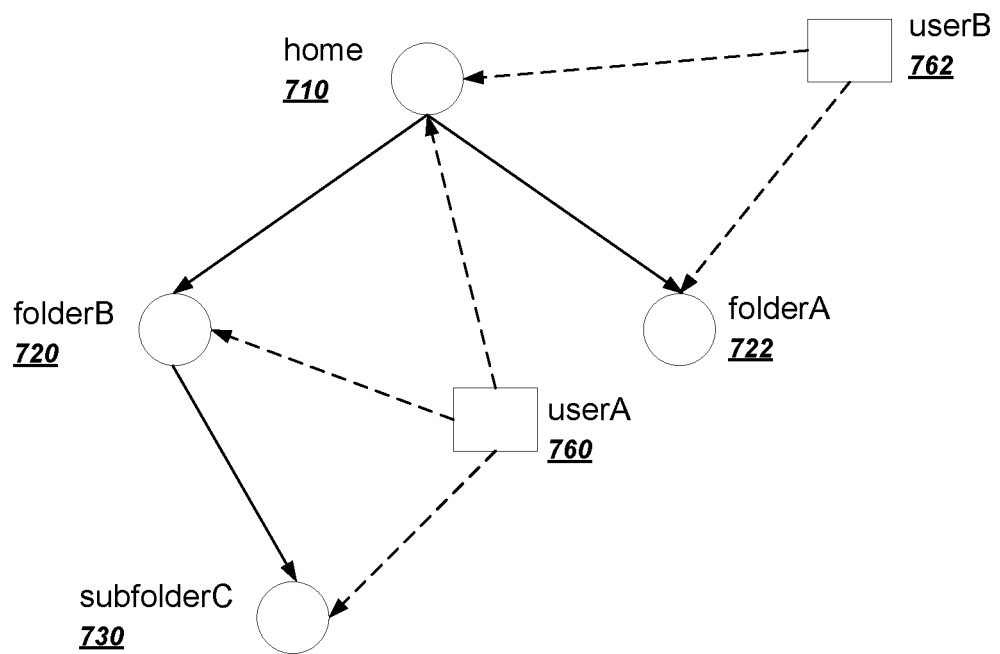
FIG. 7 illustrates an example hybrid graph.

FIG. 7 illustrates an example hybrid graph. The hybrid graph has the same resource structure as the example graph shown in FIG. 5A, having four resource nodes 710, 720, 722, and 730 representing folders in a file system.

The hybrid graph has resource-resource links between resource nodes, which represent the structure of the resources in the system. In this example, the resource-resource links represent directory inclusion.

The hybrid graph also includes two user nodes 760 and 762 representing distinct users in the system. The hybrid graph has user-resource links that represent which resources each user accessed.

In this example, the user-resource links are likely to indicate that the home folder is more popular than the other folders because the home folder was accessed by more users than the other folders.

As shown in FIG. 6, the system computes a score for resources in the system according to the hybrid graph (620). In general the score represents a measure of popularity for resources in the system based on the relationships represented by the graph. Thus, resources that are accessed by more users will have higher scores and resources that are accessed by fewer users will have lower scores.

In some implementations, the system computes a score having a first component representing the likelihood of a user performing a random navigation through resource-resource links ending up at the node and a second component representing the likelihood of a user reaching a resource represented by a child node from a resource represented by a parent node of the child node.

The system can iteratively compute the score for each node S(i) according to the following equation:

$$S(i) = \frac{(1-d)}{N} + d \cdot \sum_j \frac{S(j)}{\text{out}(j)},$$

where each node j represents another user node or another resource node having a link to the node i, N is the number of nodes in the hybrid graph, and where d is a damping factor. For nodes that do not have any outgoing edges, the system can distribute their scores equally among all the N nodes in the graph.

The system selects resource nodes having the highest scores (630). The system can rank the resources nodes by the computed scores and select the highest-ranking resource nodes as being the most popular nodes in the system. The system can select a predetermined number of the highest-ranking resource nodes, or alternatively, the system can select all resource nodes having a score that satisfies a threshold.

The system adds paths to the selected resource nodes to all initial path graphs (640). After determining the most popular nodes, the system can add paths to all of the most popular nodes to the initial path graphs for all users in the subject system. By doing so, the system treats each user as if the user had accessed each of the most popular folders. When using the peer-based approach, the system treats each of the user's peers as if they had accessed each of the most popular folders.

By adding the paths to the most popular folders, the system can reduce the amount of false positives generated due to users visiting folders that they don't frequently visit, but which are otherwise popular among users in the system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    obtaining user behavior data representing behavior of a user in a subject system, wherein the user behavior data indicates one or more resources accessed by the user in the subject system and, for each resource accessed by the user, when the resource was accessed;
    generating test data from the user behavior data, the test data comprising a first representation of resources accessed by the user during a test time period;
    generating training data from the user behavior data, the training data comprising a respective second representation of resources accessed by the user for each of multiple time periods prior to the test time period;
    generating an initial model from the training data, the initial model having first characteristic features of the training data;
    generating a resampling model from the training data and from multiple instances of the first representation for the test time period, the resampling model having second characteristic features of the training data and the multiple instances of the first representation for the test time period;
    computing a difference between the initial model and the resampling model including comparing the first characteristic features of the training data and the second characteristic features of the training data and the multiple instances of the first representation for the test time period; and
    classifying the user behavior in the test time period as anomalous based on the difference between the initial model and the resampling model.

2. The method of claim 1, wherein the user behavior data comprises user access records that each represent a folder or a file accessed by the user in a file system.

3. The method of claim 1, further comprising:
    generating a first matrix that includes vectors of the training data and N instances of a same vector of the test data; and
    performing principal component analysis on the first matrix to generate a first plurality of principal components of the first matrix;
    generating a second matrix from a plurality of vectors of the training data; and
    performing principal component analysis on the second matrix to generate a second plurality of principal components of the second matrix, wherein computing a difference between the initial model and the resampling model comprises computing an angle between one or more of the first plurality of principal components and the second plurality of principal components.

4. The method of claim 1, further comprising:
generating a first matrix that includes vectors of the training data and N instances of a same vector of the test data;
performing singular value decomposition on the first matrix to generate a first plurality of principal components of the first matrix;
generating a second matrix from a plurality of vectors of the training data; and
performing singular value decomposition on the second matrix to generate a second plurality of principal components of the second matrix,
wherein computing a difference between the initial model and the resampling model comprises computing an angle between one or more of the first plurality of principal components and the second plurality of principal components.

5. A system comprising:
one or more computers and one or more storage devices storing instructions that are operable, when executed by the one or more computers, to cause the one or more computers to perform operations comprising,
obtaining user behavior data representing behavior of a user in a subject system, wherein the user behavior data indicates one or more resources accessed by the user in the subject system and, for each resource accessed by the user, when the resource was accessed;
generating test data from the user behavior data, the test data comprising a first representation of resources accessed by the user during a test time period;
generating training data from the user behavior data, the training data comprising a respective second representation of resources accessed by the user for each of multiple time periods prior to the test time period;
generating an initial model from the training data, the initial model having first characteristic features of the training data;
generating a resampling model from the training data and from multiple instances of the first representation for the test time period, the resampling model having second characteristic features of the training data and the multiple instances of the first representation for the test time period;
computing a difference between the initial model and the resampling model including comparing the first characteristic features of the training data and the second characteristic features of the training data and the multiple instances of the first representation for the test time period; and
classifying the user behavior in the test time period as anomalous based on the difference between the initial model and the resampling model.

6. The system of claim 5, wherein the user behavior data comprises user access records that each represent a folder or a file accessed by the user in a file system.

7. The system of claim 5, further operable to perform operations comprising:
generating a first matrix that includes vectors of the training data and N instances of a same vector of the test data; and
performing principal component analysis on the first matrix to generate a first plurality of principal components of the first matrix;
generating a second matrix from a plurality of vectors of the training data; and
performing principal component analysis on the second matrix to generate a second plurality of principal components of the second matrix,
wherein computing a difference between the initial model and the resampling model comprises computing an angle between one or more of the first plurality of principal components and the second plurality of principal components.

8. The system of claim 5, further operable to perform operations comprising:
generating a first matrix that includes vectors of the training data and N instances of a same vector of the test data;
performing singular value decomposition on the first matrix to generate a first plurality of principal components of the first matrix;
generating a second matrix from a plurality of vectors of the training data; and
performing singular value decomposition on the second matrix to generate a second plurality of principal components of the second matrix,
wherein computing a difference between the initial model and the resampling model comprises computing an angle between one or more of the first plurality of principal components and the second plurality of principal components.

9. One or more non-transitory computer storage media encoded with computer program instructions that when executed by one or more computers cause the one or more computers to perform operations comprising:
obtaining user behavior data representing behavior of a user in a subject system, wherein the user behavior data indicates one or more resources accessed by the user in the subject system and, for each resource accessed by the user, when the resource was accessed;
generating test data from the user behavior data, the test data comprising a first representation of resources accessed by the user during a test time period;
generating training data from the user behavior data, the training data comprising a respective second representation of resources accessed by the user for each of multiple time periods prior to the test time period;
generating an initial model from the training data, the initial model having first characteristic features of the training data;
generating a resampling model from the training data and from multiple instances of the first representation for the test time period, the resampling model having second characteristic features of the training data and the multiple instances of the first representation for the test time period;
computing a difference between the initial model and the resampling model including comparing the first characteristic features of the training data and the second characteristic features of the training data and the multiple instances of the first representation for the test time period; and
classifying the user behavior in the test time period as anomalous based on the difference between the initial model and the resampling model.

10. The non-transitory computer storage media of claim 9, wherein the user behavior data comprises user access records that each represent a folder or a file accessed by the user in a file system.

11. The non-transitory computer storage media of claim 9, further comprising instructions that when executed by one or more computers cause the one or more computers to perform operations comprising:
- generating a first matrix that includes vectors of the training data and N instances of a same vector of the test data; and
- performing principal component analysis on the first matrix to generate a first plurality of principal components of the first matrix;
- generating a second matrix from a plurality of vectors of the training data; and
- performing principal component analysis on the second matrix to generate a second plurality of principal components of the second matrix,
- wherein computing a difference between the initial model and the resampling model comprises computing an angle between one or more of the first plurality of principal components and the second plurality of principal components.

12. The non-transitory computer storage media of claim 9, further comprising instructions that when executed by one or more computers cause the one or more computers to perform operations comprising:
- generating a first matrix that includes vectors of the training data and N instances of a same vector of the test data;
- performing singular value decomposition on the first matrix to generate a first plurality of principal components of the first matrix;
- generating a second matrix from a plurality of vectors of the training data; and
- performing singular value decomposition on the second matrix to generate a second plurality of principal components of the second matrix,
- wherein computing a difference between the initial model and the resampling model comprises computing an angle between one or more of the first plurality of principal components and the second plurality of principal components.

* * * * *